D. JACQUES.
WINCH.
APPLICATION FILED JUNE 16, 1913.
1,125,107.
Patented Jan. 19, 1915.
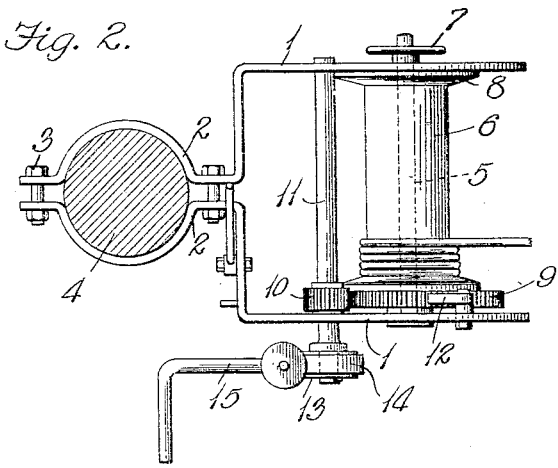
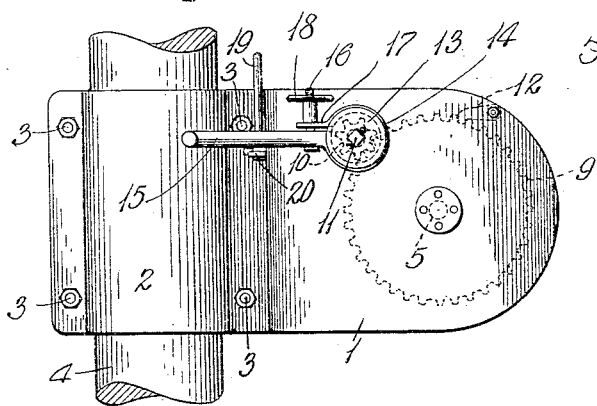
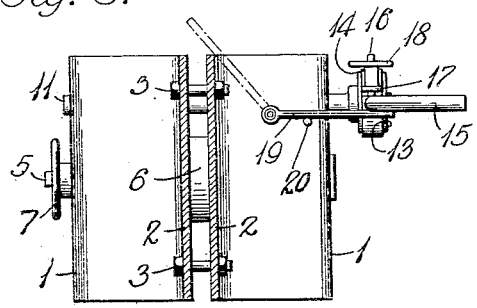
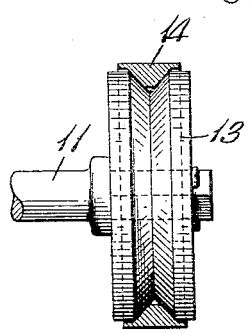
Witnesses
Chas. W. Stauffiger
Anna M. Dorr
Inventor
Damase Jacques,
By
Attorneys

UNITED STATES PATENT OFFICE.

DAMASE JACQUES, OF DETROIT, MICHIGAN.

WINCH.

1,125,107.  Specification of Letters Patent.  Patented Jan. 19, 1915.

Application filed June 16, 1913. Serial No. 773,929.

*To all whom it may concern:*

Be it known that I, DAMASE JACQUES, a citizen of the United States of America, residing at Detroit, in the county of Wayne and State of Michigan, have invented certain new and useful Improvements in Winches, of which the following is a specification, reference being had therein to the accompanying drawings.

In the operation of winches under load, and in the use of such devices where it is advisable that they be under the control of a single operator, as in lowering away boats from ships or the like, it is necessary that the controlling means be within the range of the person manning the operating crank.

This invention relates to winches that are so disposed that the operator can raise or lower away either by turning the handle or by the use of a braking device which is within easy reach.

The invention also includes an arrangement of parts which provides for great strength coupled with lightness and simplicity of construction.

The invention consists in the matters hereinafter set forth and more particularly pointed out in the appended claims.

In the drawings, Figure 1 is a view in side elevation of a winch that embodies features of the invention; Fig. 2 is a plan view thereof; Fig. 3 is a view in rear elevation of a device showing the handle locked for lowering; and Fig. 4 is a view in detail, enlarged, of a frictional connection between an operating handle and a counter shaft.

As herein shown, a winch is formed of a pair of oppositely disposed plates 1 having suitably arranged clamping arms 2 that are held together by bolts 3 or the like around a suitable support 4, as for example, a stanchion or davit. Obviously the members 2 may be of any preferred form for attachment to any desired support. The members 1 are formed of sheet metal and support a fixed shaft 5 on which the barrel 6 is rotatably mounted. A clamping wheel 7 screwthreaded on to the end of the shaft is arranged to draw the members 1 together to frictionally engage the end flange 8 of the drum. A gear 9 on the drum at the other end thereof meshes with a pinion 10 on a counter shaft 11, a pawl or dog 12 being provided that may be thrown into engagement with the gear 9 to hold it locked.

A friction drum 13 is non-rotatably secured on the crank end of the shaft 11 and is fitted with a friction face on which a flexible brake band 14 is seated. The face may be concave or plane with retaining flange or be otherwise arranged to prevent sidewise displacement of the band. A crank handle 15 is attached to one end of the band and a stud 16 that passes through the handle likewise passes through an apertured ear 17 on the other end of the band. A hand wheel 18 that is screwthreaded on to the stud regulates frictional engagement with the drum 13 by forcing the ear 17 toward the crank handle more or less and thereby tightening the strap accordingly more or less around the friction drum 13. A latch 19 of any preferred type is pivotally secured to one of the frame members 1 to swing against a stop 20 into the path of the crank 15 and thereby hold the latter.

In operation the device is set so that the drum turns readily on the shaft. When the operator sets up the friction brake he readily manipulates the winch in the ordinary manner. By dropping the latch, which is readily reached from the position of a person operating the handle into interlocking relation with the crank, on holding the crank stationary the drum is arrested and thereafter the operator may allow it to turn slowly by release of the friction band through use of the wheel on the crank handle The frictional engagement of the drum flange and supporting member may also be varied in emergencies by a person at the other side of the winch, the latter operating as a safety device. As the pawl, the crank, the latch and the friction band normally regulating the winch are all within reach of a person manning the winch, it is especially adaptable for use on a ship's davit for lowering or raising a boat, one person readily controlling the winch even when under heavy load. Thus even when a ship is short manned the boats may be lowered without the necessity of a number of men to handle the ropes.

Obviously changes in the details of construction may be made without departing from the spirit of my invention and I do not care to limit myself to any particular form or arrangement of parts.

What I claim is:—

1. In a winch, a drum, a rotatable operating member, a friction drum secured thereon, a friction strap encircling the drum, a crank handle secured to one end of the strap, a stud on the handle engaging the other end of the strap, and a clamping wheel on the stud for drawing the friction strap around the drum.

2. In a winch, a drum, a countershaft geared to the drum, a circular friction plate on the countershaft, a friction band encircling the plate, a crank handle secured to an end portion of the band, a stud from the other end portion of the band longitudinally reciprocable through a guide aperture in the handle, a clamping wheel screw-threaded on the stud for drawing the handle and band end portion together, and a latch for holding the handle whereby the clamping wheel may be used to brake the motion of the plate and shaft.

In testimony whereof I affix my signature in presence of two witnesses.

DAMASE JACQUES.

Witnesses:
C. R. STICKNEY,
A. M. DORR.

Copies of this patent may be obtained for five cents each, by addressing the "Commissioner of Patents, Washington, D. C."